(12) United States Patent
Ueda

(10) Patent No.: US 10,519,836 B2
(45) Date of Patent: Dec. 31, 2019

(54) CATALYST STRUCTURE

(71) Applicant: TOYOTA JIDOSHA KABUSHIKI KAISHA, Toyota-shi, Aichi-ken (JP)

(72) Inventor: Hiroyoshi Ueda, Chigasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/395,372

(22) Filed: Apr. 26, 2019

(65) Prior Publication Data

US 2019/0345862 A1  Nov. 14, 2019

(30) Foreign Application Priority Data

May 8, 2018 (JP) .................. 2018-089935

(51) Int. Cl.
*F01N 3/28* (2006.01)
*B01D 53/94* (2006.01)
*B01J 15/00* (2006.01)

(52) U.S. Cl.
CPC ........... *F01N 3/2807* (2013.01); *B01D 53/94* (2013.01); *B01J 15/005* (2013.01); *F01N 2330/12* (2013.01)

(58) Field of Classification Search
CPC ... F01N 2330/12; F01N 3/2087; B01D 53/94; B01J 15/005
USPC ................................................ 422/177, 180
See application file for complete search history.

(56) References Cited

U.S. PATENT DOCUMENTS

| | | | | |
|---|---|---|---|---|
| 3,785,781 A | * | 1/1974 | Hervert ................. | B01D 53/86 422/171 |
| 4,464,482 A | | 8/1984 | Bird et al. | |
| 5,328,774 A | * | 7/1994 | Maus ..................... | B01J 35/04 428/593 |

FOREIGN PATENT DOCUMENTS

| | | |
|---|---|---|
| JP | S57-117345 A | 7/1982 |
| JP | S63-302953 A | 12/1988 |
| JP | H05-168944 | 7/1993 |
| JP | 2001-224967 A | 8/2001 |
| WO | 02/062466 A2 | 8/2002 |

* cited by examiner

*Primary Examiner* — Tom P Duong
(74) *Attorney, Agent, or Firm* — Oliff PLC

(57) ABSTRACT

A catalyst structure, which makes it possible to reduce the flow passage resistance and raise the purification rate, is provided. A catalyst structure provided in an exhaust passage of an internal combustion engine comprises a base member which is formed by combining wire-shaped members, wherein the wire-shaped members do not include any wire-shaped member which is arranged to be orthogonal to a flow direction of an exhaust gas, and the wire-shaped members include wire-shaped members which are arranged obliquely with respect to the flow direction of the exhaust gas. The change in the cross-sectional area of the base member is suppressed by arranging the wire-shaped members obliquely with respect to the flow direction of the exhaust gas.

7 Claims, 7 Drawing Sheets

CATALYST STRUCTURE

CROSS REFERENCE TO RELATED APPLICATION

This application claims the benefit of Japanese Patent Application No. 2018-089935, filed on May 8, 2018, which is hereby incorporated by reference herein in its entirety.

BACKGROUND

Technical Field

The present disclosure relates to a catalyst structure.

Description of the Related Art

In relation to a catalyst structure which is provided in an exhaust passage of an internal combustion engine, such a technique is known that a base member is woven up with metal thin wires in place of a monolith type base member which is formed of a ceramics or a metal thin plate (see, for example, Patent Literature 1). The base member, which relates to this technique, is formed so that a three-dimensional shape is provided by combining a group of warp wires which are orthogonal to the flow direction of the exhaust gas, a group of weft wires which are orthogonal to the flow direction of the exhaust gas and which are orthogonal to the group of warp wires, and a group of vertical wires which are parallel to the flow direction of the exhaust gas and which are orthogonal to the group of warp wires and the group of weft wires.

PRIOR ART LITERATURE

Patent Literature

Patent Literature 1: Japanese Patent Application Laid-Open No. 63-302953

SUMMARY

The catalyst structure described above aims to increase the surface area by forming the base member in a mesh form so that the opportunity is thereby increased for the exhaust gas and the catalyst to make contact with each other. However, in the case of the structure described above, the cross-sectional area of the base member is greatly changed in the flow direction of the exhaust gas, and thus the compression and the expansion of the exhaust gas are continuously repeated. That is, the exhaust gas is compressed when the exhaust gas passes across the warp wire or the weft wire, and the exhaust gas is expanded after the exhaust gas passes across the warp wire or the weft wire. It has been found out that the flow passage resistance is increased by means of the repetition of the compression and the expansion of the exhaust gas as described above, as compared with the conventional monolith type base member.

The present disclosure has been made taking the foregoing problem into consideration, an object of which is to provide a catalyst structure which makes it possible to reduce the flow passage resistance and raise the purification rate.

One aspect of the present disclosure resides in a catalyst structure provided in an exhaust passage of an internal combustion engine, the catalyst structure comprising a base member which is formed by combining wire-shaped members, wherein the wire-shaped members do not include any wire-shaped member which is arranged to be orthogonal to a flow direction of an exhaust gas, and the wire-shaped members include wire-shaped members which are arranged obliquely with respect to the flow direction of the exhaust gas.

The base member is constructed by combining the wire-shaped members, and thus the surface area can be increased as compared with any base member which is constructed by surfaces. Therefore, it is possible to increase the opportunity for the exhaust gas and the catalyst to make contact with each other, and hence it is possible to expect the improvement in the purification rate of the exhaust gas. In this context, if the cross-sectional area of the base member is changed in the flow direction of the exhaust gas, then the expansion and the compression of the exhaust gas are caused on account of the change in the flow passage area, and hence the pressure loss may be increased. That is, if the cross-sectional area of the base member, which is provided in the cross section orthogonal to the flow direction of the exhaust gas, is greatly changed in the flow direction of the exhaust gas, the pressure loss is increased. Then, if the wire-shaped members are arranged so that the wire-shaped members are orthogonal to the flow direction of the exhaust gas, the change in the cross-sectional area of the base member is increased. In this situation, the exhaust gas is compressed when the exhaust gas passes across the wire-shaped member, and the exhaust gas is expanded after the exhaust gas passes across the wire-shaped member. Therefore, pressure loss is increased. On the other hand, it is possible to suppress the change in the cross-sectional area of the base member in the flow direction of the exhaust gas by arranging the wire-shaped members obliquely with respect to the flow direction of the exhaust gas. Therefore, it is possible to suppress the change in the flow passage area. That is, when the base member is formed by combining the wire-shaped members, then the structure does not include any wire-shaped member which is arranged to be orthogonal to the flow direction of the exhaust gas, and the structure includes the wire-shaped members which are arranged obliquely with respect to the flow direction of the exhaust gas. By doing so, it is possible to suppress the change in the cross-sectional area of the base member in the flow direction of the exhaust gas. When the base member is formed as described above, it is thereby possible to suppress the cross-sectional area of the base member provided in the cross section orthogonal to the flow direction of the exhaust gas from being changed in the flow direction of the exhaust gas. Accordingly, it is possible to suppress the occurrence of the expansion and the compression of the exhaust gas. Therefore, it is possible to reduce the pressure loss. In this way, it is possible to reduce the flow passage resistance, and it is possible to raise the purification rate of the exhaust gas.

Further, the base member may be provided with a plurality of inclined portions at which the wire-shaped members are arranged obliquely with respect to the flow direction of the exhaust gas; and intersecting portions at each of which the plurality of inclined portions intersect at both ends of each of the inclined portions, wherein the plurality of inclined portions may be arranged radially around a center of the intersecting portion on an upstream side and a downstream side in the flow direction of the exhaust gas at each of the intersecting portions.

At each of the intersecting portions, the plurality of inclined portions are arranged radially toward the plurality of intersecting portions provided on the upstream side, and the plurality of inclined portions are arranged radially toward the plurality of intersecting portions provided on the downstream side. Then, the same or equivalent intersecting portions are also formed respectively at the end portion disposed on the opposite side of each of the inclined portions arranged radially. Therefore, the inclined portions and the intersecting portions can be arranged repeatedly in the flow direction of the exhaust gas. Further, the wire-shaped members can be arranged so that the wire-shaped members are not orthogonal to the flow direction of the exhaust gas. Accordingly, it is possible to suppress the occurrence of the expansion and the compression of the exhaust gas, and hence it is possible to reduce the pressure loss. That is, the inclined portions are arranged obliquely with respect to the flow direction of the exhaust gas, and thus it is possible to suppress any great change in the cross-sectional area of the base member in the flow direction of the exhaust gas. Therefore, it is possible to reduce the pressure loss. Further, the flow passages for the exhaust gas are formed in a mesh form. Therefore, it is possible to increase the opportunity for the exhaust gas and the catalyst to make contact with each other. Further, the provision of the intersecting portion makes it possible to raise the rigidity of the base member. The intersecting portion may have a length in the flow direction of the exhaust gas so that the intersecting portion is parallel to the flow direction of the exhaust gas.

Further, the base member may be densified on a downstream side as compared with an upstream side in the flow direction of the exhaust gas. The phrase "base member is densified" means that the density of the base member is increased. In this context, when the exhaust gas passes across the catalyst structure, the concentration of the purification target substance is more lowered on the downstream side. Therefore, the reaction velocity of the purification target substance is more lowered on the downstream side. That is, the purification rate of the purification target substance may be more lowered on the downstream side. On the contrary, when the base member is densified on the downstream side as compared with the upstream side, it is possible to increase the opportunity for the purification target substance and the catalyst to make contact with each other. Therefore, it is possible to improve the purification rate of the purification target substance.

Further, an angle of the inclined portion with respect to the flow direction of the exhaust gas may be more increased on the downstream side in the flow direction of the exhaust gas. The base member can be more densified on the downstream side by more increasing the angle of the inclined portion on the downstream side as described above. Further, when the base member is continuously densified, it is thereby possible to suppress the increase in the pressure loss.

Further, the base member may be densified on an upstream side as compared with a downstream side in the flow direction of the exhaust gas. When the base member is densified on the upstream side as compared with the downstream side, then a larger amount of heat can be received on the upstream side, and it is possible to suppress the release of heat from the base member to the outside. Therefore, the temperature of the base member can be raised more promptly on the upstream side. Therefore, even when the temperature of the catalyst is low, for example, upon the cold start, it is possible to purify the purification target substance at the early stage. Therefore, it is possible to improve the purification rate of the purification target substance, for example, upon the cold start of the internal combustion engine.

Further, an angle of the inclined portion with respect to the flow direction of the exhaust gas may be more increased on the upstream side in the flow direction of the exhaust gas. The base member can be more densified on the upstream side by more increasing the angle of the inclined portion on the upstream side. Further, when the base member is continuously densified, it is thereby possible to suppress the increase in the pressure loss.

Further, a density of the base member may differ in a direction perpendicular to the flow direction of the exhaust gas. In this case, the density of the base member may be the highest on an extension line of the central axis of an exhaust pipe, and the density of the base member may be lowered at positions separated farther from the extension line of the central axis of the exhaust pipe. Further, the density of the base member may be rather raised on the side of the central axis of the base member as compared with the outer circumferential side of the base member. In relation thereto, the higher the density of the base member is, the more hardly the exhaust gas flows. The exhaust gas can be allowed to flow uniformly across the entire base member by utilizing this phenomenon such that the density is raised at portions into which a larger amount of the exhaust gas may flow. Accordingly, it is possible to improve the purification rate of the purification target substance.

According to the present disclosure, it is possible to provide the catalyst structure which makes it possible to reduce the flow passage resistance and raise the purification rate.

DESCRIPTION OF THE EMBODIMENTS

A detailed explanation will be made exemplarily below with reference to the drawings about an embodiment for carrying out the present disclosure. However, for example, the dimension or size, the material, the shape, and the relative arrangement of constitutive parts or components described in the embodiment are not intended to limit the scope of the disclosure only thereto unless specifically noted.

First Embodiment

Figure 1:
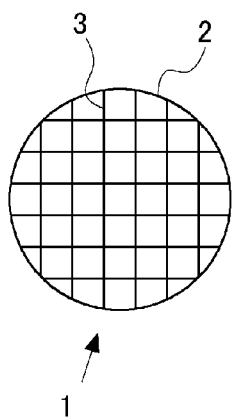
FIG. 1 shows a catalyst structure according to a first embodiment as viewed from the upstream side in the flow direction of the exhaust gas.
Figure 2:
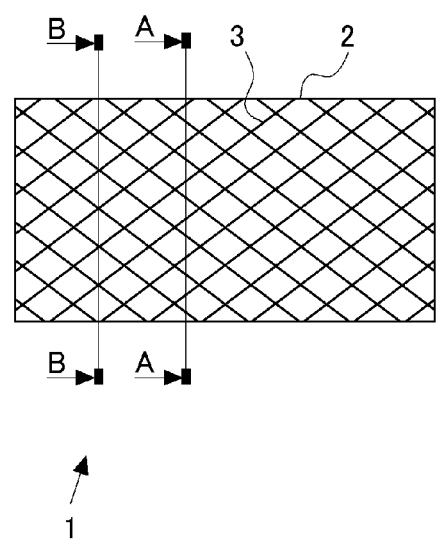
FIG. 2 shows a sectional view obtained by sectioning the catalyst structure according to the first embodiment along the central axis of the catalyst structure in parallel to the flow direction of the exhaust gas.

FIGS. 1 and 2 show schematic drawings of a catalyst structure according to this embodiment. FIG. 1 shows the catalyst structure 1 as viewed from the upstream side in the flow direction of the exhaust gas. FIG. 2 shows a sectional view obtained by sectioning the catalyst structure 1 along the central axis of the catalyst structure 1 in parallel to the flow direction of the exhaust gas. With reference to FIG. 2, the left side is the upstream side of the flow of the exhaust gas, and the right side is the downstream side of the flow of the exhaust gas. The catalyst structure 1 is provided in an exhaust passage of an internal combustion engine. The catalyst structure 1 is constructed to include a cylindrical outer circumferential portion 2 and a base member 3 which is formed in the outer circumferential portion 2. The base member 3 is formed of a material which can endure the temperature of the exhaust gas, the material (for example, metal, ceramics or the like) being capable of carrying a catalyst (for example, Pt, Pb, Ba, Li, K or the like). The outer circumferential portion 2 and the base member 3 may be formed of an identical material. Alternatively, the outer circumferential portion 2 and the base member 3 may be formed of different materials. Note that when the base member 3 is formed of ceramics, the catalyst may be previously contained in the ceramics.

Figure 3:
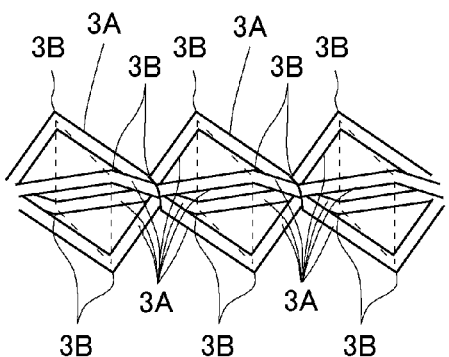
FIG. 3 shows an enlarged view illustrating a base member according to the first embodiment.

The base member 3 is constructed such that the material is formed to be wire-shaped. The base member 3 is formed three-dimensionally together with the outer circumferential portion 2 by using, for example, a 3D printer. FIG. 3 shows an enlarged view illustrating the base member 3. The base member 3 is constructed to include a plurality of wire-shaped inclined portions 3A which are arranged obliquely with respect to the flow direction of the exhaust gas shown by an arrow in FIG. 3 (i.e., in the direction parallel to the central axis of the catalyst structure 1), and a plurality of intersecting portions 3B at which the plurality of inclined portions 3A intersect and they are joined with each other. Note that in FIG. 3, parts of the inclined portions 3A, which intersect at the intersecting portions 3B, are omitted from the illustration. The plurality of inclined portions 3A extend radially from each of the intersecting portions 3B toward the plurality of other intersecting portions 3B which are positioned on the obliquely downstream side in the flow direction of the exhaust gas. When the structure is viewed from the upstream side of the flow of the exhaust gas, the respective inclined portions 3A extend radially at equal angles from the intersecting portion 3B. Therefore, as shown in FIG. 3, when the four inclined portions 3A extend from each of the intersecting portions 3B, if the structure is viewed from the upstream side of the flow of the exhaust gas, then the respective inclined portions 3A are arranged at intervals of 90 degrees around the center of the intersecting portion 3B. Further, the respective inclined portions 3A are arranged so that the angles of the respective inclined portions 3A are identical with respect to the flow direction of the exhaust gas. The plurality of intersecting portions 3B are arranged in the same manner as described above in the direction which is orthogonal to the flow direction of the exhaust gas. Then, the four inclined portions 3A, which extend respectively to the downstream side in the flow direction of the exhaust gas from the four intersecting portions 3B that adjoin in the direction orthogonal to the flow direction of the exhaust gas, intersect at the intersecting portion 3B disposed on the downstream side and they are joined to one another. The inclined portions 3A, which intersect at the intersecting portion 3B, are also arranged at equal angles when they are viewed from the upstream side of the flow of the exhaust gas. In this way, the plurality of inclined portions 3A, which extend from the plurality of intersecting portions 3B positioned on the obliquely upstream side in the flow direction of the exhaust gas, intersect at each of the intersecting portions 3B. Further, the plurality of inclined portions 3A extend radially toward the plurality of intersecting portions 3B which are positioned on the obliquely downstream side in the flow direction of the exhaust gas, at each of the intersecting portions 3B. As described above, the inclined portions 3A and the intersecting portions 3B are arranged alternately in the flow direction of the exhaust gas. Accordingly, the base member 3 is formed so that the base member 3 does not include any wire-shaped member which is arranged to be orthogonal to the flow direction of the exhaust gas and the base member 3 includes the wire-shaped members which are arranged obliquely with respect to the flow direction of the exhaust gas.

Figure 4:
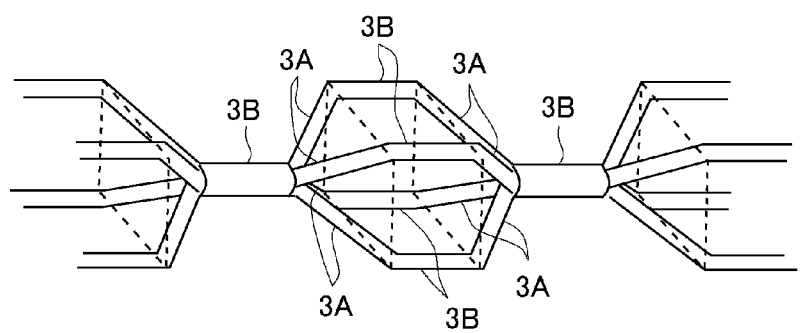
FIG. 4 shows an enlarged view illustrating a base member when intersecting portions according to the first embodiment have lengths in the flow direction of the exhaust gas.

Note that the intersecting portion 3B may have a length in the flow direction of the exhaust gas. FIG. 4 shows an enlarged view illustrating the base member 3 when the intersecting portions 3B have lengths in the flow direction of the exhaust gas. The intersecting portion 3B shown in FIG. 4 is formed to have a columnar shape having the central axis which is parallel to the flow direction of the exhaust gas. Therefore, it is affirmed that the intersecting portion 3B is not orthogonal to the flow direction of the exhaust gas as well. Further, in FIGS. 3 and 4, the inclined portion 3A and the intersecting portion 3B are formed to have columnar shapes respectively. However, the shape is not limited thereto. It is also allowable to form the portion so that, for example, the cross section is polygonal. Further, the number of the inclined portions 3A is not limited to four, the inclined portions 3A extending from each of the intersecting portions 3B to the other intersecting portions 3B positioned on the downstream side.

Figure 5:
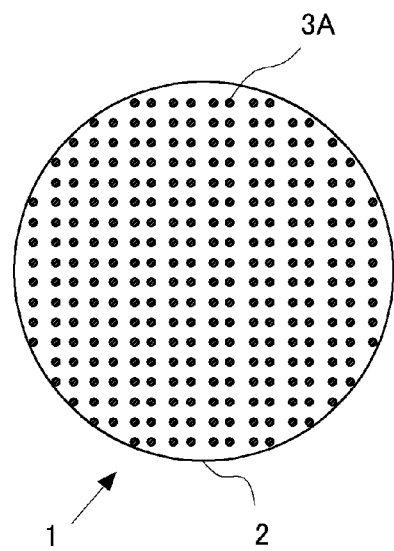
FIG. 5 shows a sectional view taken along a cross section A-A shown in FIG. 2.
Figure 6:
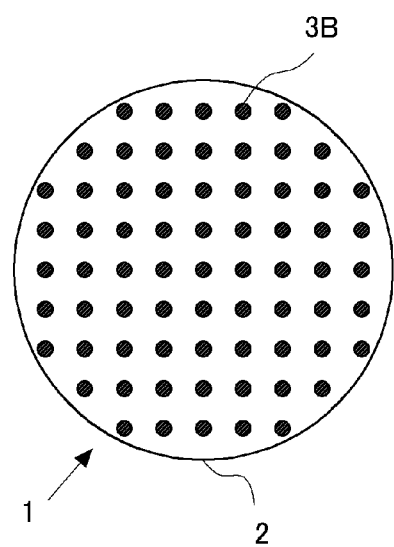
FIG. 6 shows a sectional view taken along a cross section B-B shown in FIG. 2.

FIG. 5 shows a sectional view taken along a cross section A-A shown in FIG. 2. FIG. 6 shows a sectional view taken along a cross section B-B shown in FIG. 2. FIG. 5 is a cross-sectional view obtained by sectioning the base member 3 at the inclined portions 3A. FIG. 6 is a cross-sectional view obtained by sectioning the base member 3 at the intersecting portions 3B. The base member 3 is formed so that the cross-sectional area of the base member 3, which is provided in the cross section orthogonal to the flow direction of the exhaust gas, is constant in the flow direction of the exhaust gas. That is, the angles of the inclined portions 3A and the dimensions of the inclined portions 3A and the intersecting portions 3B are determined so that the total area in the cross section of the inclined portions 3A shown in FIG. 5 is the same as the total area in the cross section of the intersecting portions 3B shown in FIG. 6.

In this context, the base member 3 is constructed by the wire (wire-forming member) not by any surface (surface-forming member), and thus it is possible to increase the surface area per average opening area. Note that the opening area is the area of the space (area of portions at which the base member 3 does not exist) obtained when the base member 3 is sectioned along the surface orthogonal to the flow direction of the exhaust gas (i.e., the direction of the central axis of the catalyst structure 1). The average opening area is the area obtained by averaging the respective opening areas in the flow direction of the exhaust gas. When the surface area per average opening area is increased, the opportunity for the exhaust gas and the catalyst to make contact with each other is increased thereby. Therefore, it is possible to raise the purification rate.

Further, the cross-sectional area of the base member 3 is constant in the flow direction of the exhaust gas, and thus the exhaust gas is suppressed from the repetition of expansion and compression when the exhaust gas passes across the catalyst structure 1. Therefore, it is possible to reduce the pressure loss. Note that it is not necessarily indispensable that the cross-sectional area of the base member 3 is strictly constant in the flow direction of the exhaust gas. It is allowable that the cross-sectional area of the base member 3 may change, provided that the pressure loss is within an allowable range. For example, when the cross-sectional areas of the base member 3, which are provided in the cross sections orthogonal to the flow direction of the exhaust gas, are compared with each other at arbitrary two positions which are different from each other in the flow direction of the exhaust gas, it is allowable that the difference in the cross-sectional area is not more than a predetermined value. The predetermined value is determined, for example, by means of any experiment or simulation so that the pressure loss, which is provided when the exhaust gas passes across the catalyst structure 1, is within the allowable range.

Figure 7:
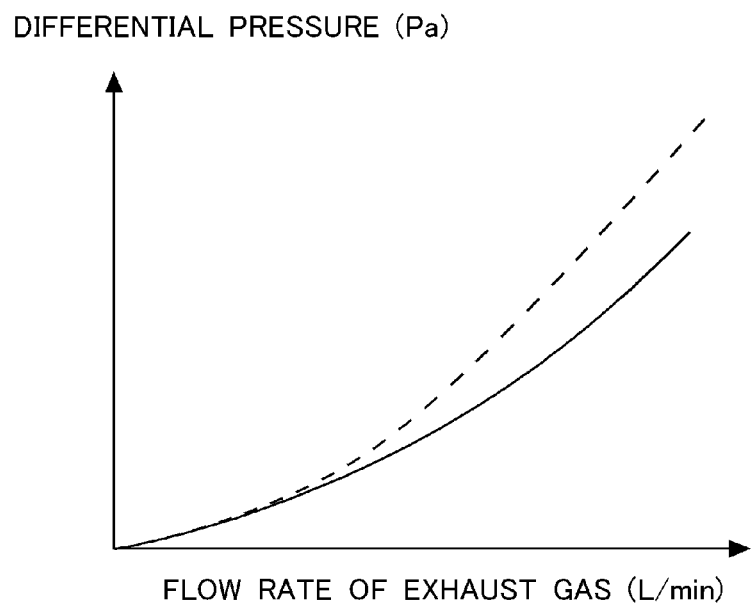
FIG. 7 shows a relationship between the flow rate of the exhaust gas and the differential pressure between the upstream side and the downstream side from the base member.

FIG. 7 shows a relationship between the flow rate of the exhaust gas and the differential pressure between the upstream side and the downstream side from the base member 3. It is affirmed that the larger the differential pressure is, the larger the pressure loss is. The solid line indicates a case of the base member 3 according to this embodiment. The broken line indicates a case of a base member (for example, the base member described in Japanese Patent Application Laid-Open No. 63-302953, hereinafter referred to as "conventional base member" as well) formed to have a three-dimensional shape by combining a group of warp wires which are orthogonal to the flow direction of the exhaust gas, a group of weft wires which are orthogonal to the flow direction of the exhaust gas and which are orthogonal to the group of warp wires, and a group of vertical wires which are parallel to the flow direction of the exhaust gas and which are orthogonal to the group of warp wires and the group of weft wires. The base member 3 according to this embodiment is compared with the conventional base member under a condition in which the surface areas are the same. As shown in FIG. 7, the differential pressure of the base member 3 according to this embodiment is smaller than that of the conventional base member. Therefore, the differential pressure of the base member 3 according to this embodiment is smaller than that of the conventional base member under the condition in which the surface areas are the same.

Further, in the case of the conventional base member, the space (space in which no metal thin wire exists), which is surrounded by the warp wires and the weft wires, is relatively large when the base member is viewed from the upstream side in the flow direction of the exhaust gas. Therefore, the exhaust gas, which passes through the vicinity of the center of the space, easily passes across the base member without making any contact with any one of the warp wire, the weft wire, and the vertical wire. Therefore, any great increase in the purification rate is not expected by merely increasing the surface area of the base member. On the other hand, in the case of the base member 3 according to this embodiment, the inclined portions 3A are arranged obliquely with respect to the flow of the exhaust gas. Therefore, the contact with the exhaust gas is facilitated. On this account, it is possible to improve the purification rate.

In this way, the base member 3 is formed so that no wire is orthogonal to the flow of the exhaust gas, i.e., the base member 3 is formed so that the wires for forming the base member 3 is oblique or parallel to the flow direction of the exhaust gas. Thus, it is possible to suppress the change in the cross-sectional area. Therefore, it is possible to reduce the pressure loss. Further, it is possible to more increase the surface area by constructing the base member 3 with the wires. Further, the inclined portions 3A spread obliquely radially with respect to the flow direction of the exhaust gas toward the downstream side from the intersecting portion 3B. Thus, the exhaust gas and the catalyst easily make contact with each other. Therefore, according to the catalyst structure 1 concerning this embodiment, it is possible to reduce the flow passage resistance, and it is possible to raise the purification rate.

Second Embodiment

Figure 8:
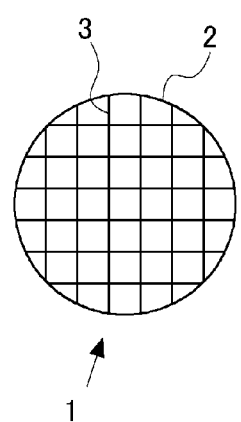
FIG. 8 shows a catalyst structure according to a second embodiment as viewed from the upstream side in the flow direction of the exhaust gas.
Figure 9:
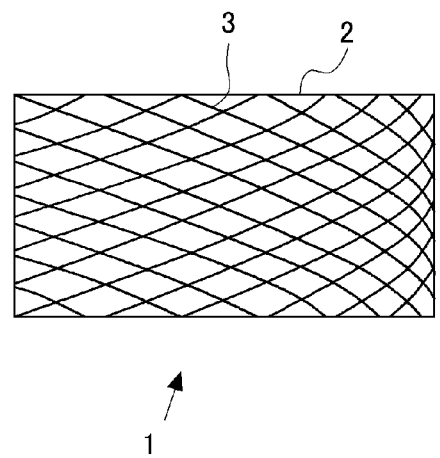
FIG. 9 shows a sectional view obtained by sectioning the catalyst structure according to the second embodiment along the central axis of the catalyst structure in parallel to the flow direction of the exhaust gas.

FIGS. 8 and 9 schematically show a catalyst structure according to this embodiment. FIG. 8 shows the catalyst structure 1 as viewed from the upstream side in the flow direction of the exhaust gas. FIG. 9 shows a sectional view obtained by sectioning the catalyst structure 1 along the central axis of the catalyst structure 1 in parallel to the flow direction of the exhaust gas. In FIG. 9, the left side is the upstream side of the flow of the exhaust gas, and the right side is the downstream side of the flow of the exhaust gas. The catalyst structure 1 according to this embodiment is formed so that the base member 3 is densified on the downstream side as compared with the upstream side in the flow direction of the exhaust gas. That is, the base member 3 is formed so that the density of the base member 3 per unit volume is large on the downstream side as compared with the upstream side in the flow direction of the exhaust gas. In this context, the angle of the inclined portion 3A with respect to the flow direction of the exhaust gas is more increased on the downstream side (the angle of the inclined portion 3A with respect to the flow direction of the exhaust gas is allowed to approach the right angle). Accordingly, the base member 3 can be densified on the downstream side as compared with the upstream side in the flow direction of the exhaust gas. In this case, the angle of the inclined portion 3A is changed within a range of the inclination in which no exfoliation occurs in relation to the flow of the exhaust gas. Accordingly, it is possible to suppress the increase in the pressure loss, and it is possible to increase the opportunity for the exhaust gas and the catalyst to make contact with each other. The range of the inclination, in which no exfoliation occurs in relation to the flow of the exhaust gas, can be determined, for example, by means of any experiment or simulation. Note that in this embodiment, it is also allowable to determine the angle of the inclined portion 3A and the dimensions of the inclined portion 3A and the intersecting portion 3B so that the difference in the cross-sectional area is not more than a predetermined value, when the cross-sectional areas of the base member 3, which are provided in the cross sections orthogonal to the flow direction of the exhaust gas, are compared with each other at arbitrary two positions which are different from each other in the flow direction of the exhaust gas.

The exhaust gas, which passes across the catalyst structure 1, flows toward the downstream side, while the purification target substance is purified by the catalyst. Therefore, the concentration of the purification target substance is more lowered on the downstream side in the catalyst structure 1. The higher the concentration of the purification target substance is, the higher the reaction velocity of the purification target substance in the catalyst is. Therefore, the reaction velocity of the purification target substance is lowered on the downstream side of the catalyst structure 1, and the purification target substance is hardly purified on the downstream side of the catalyst structure 1. On the contrary, when the base member 3 is more densified on the downstream side, it is thereby possible to more increase the opportunity for the exhaust gas and the catalyst to make contact with each other on the downstream side. Accordingly, even when the reaction velocity of the purification target substance is lowered on the downstream side of the catalyst structure 1, it is possible to suppress the deterioration of the purification rate of the purification target substance.

Note that when the base member 3 is densified on the downstream side as compared with the upstream side in the catalyst structure 1, the base member 3 may be densified in a stepwise manner. However, the base member 3 may be densified continuously. As described above, it is possible to further suppress the increase in the pressure loss by continuously densifying the base member 3.

As explained above, according to the catalyst structure 1 concerning this embodiment, it is possible to reduce the flow passage resistance, and it is possible to raise the purification rate.

Third Embodiment

Figure 10:
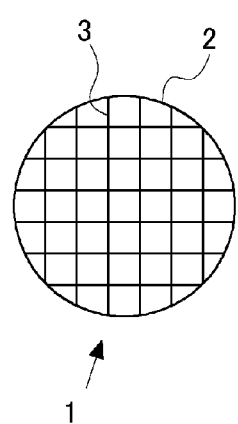
FIG. 10 shows a catalyst structure according to a third embodiment as viewed from the upstream side in the flow direction of the exhaust gas.
Figure 11:
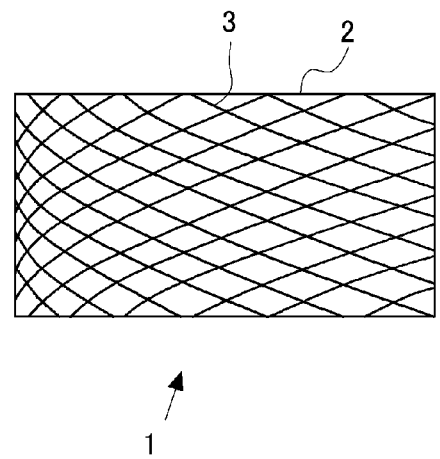
FIG. 11 shows a sectional view obtained by sectioning the catalyst structure according to the third embodiment along the central axis of the catalyst structure in parallel to the flow direction of the exhaust gas.

FIGS. 10 and 11 schematically show a catalyst structure according to this embodiment. FIG. 10 shows the catalyst structure 1 as viewed from the upstream side in the flow direction of the exhaust gas. FIG. 11 shows a sectional view obtained by sectioning the catalyst structure 1 along the central axis of the catalyst structure 1 in parallel to the flow direction of the exhaust gas. In FIG. 11, the left side is the upstream side of the flow of the exhaust gas, and the right side is the downstream side of the flow of the exhaust gas. The catalyst structure 1 according to this embodiment is formed so that the base member 3 is densified on the upstream side as compared with the downstream side in the flow direction of the exhaust gas. That is, the base member 3 is formed so that the density of the base member 3 per unit volume is large on the upstream side as compared with the downstream side in the flow direction of the exhaust gas. In this context, the angle of the inclined portion 3A with respect to the flow direction of the exhaust gas is more increased on the upstream side (the angle of the inclined portion 3A with respect to the flow direction of the exhaust gas is allowed to approach the right angle). Accordingly, the base member 3 can be densified on the upstream side as compared with the downstream side in the flow direction of the exhaust gas. In this case, the angle of the inclined portion 3A is changed within a range of the inclination in which no exfoliation occurs in relation to the flow of the exhaust gas. Accordingly, it is possible to suppress the increase in the pressure loss, and it is possible to increase the opportunity for the exhaust gas and the catalyst to make contact with each other. The range of the inclination, in which no exfoliation occurs in relation to the flow of the exhaust gas, can be determined, for example, by means of any experiment or simulation. Note that in this embodiment, it is also allowable to determine the angle of the inclined portion 3A and the dimensions of the inclined portion 3A and the intersecting portion 3B so that the difference in the cross-sectional area is not more than a predetermined value, when the cross-sectional areas of the base member 3, which are provided in the cross sections orthogonal to the flow direction of the exhaust gas, are compared with each other at arbitrary two positions which are different from each other in the flow direction of the exhaust gas.

The temperature of the catalyst is low, for example, upon the cold start of the internal combustion engine. Therefore, it may be difficult to purify the purification target substance by means of the catalyst. In such a situation, it is desired to raise the temperature of the catalyst at the early stage. In this context, the base member 3 is more densified on the upstream side, and thus it is possible to more increase the opportunity for the exhaust gas and the catalyst to make contact with each other on the upstream side. Accordingly, a larger amount of the heat of the exhaust gas can be received on the upstream side of the base member 3, and hence it is possible to promptly raise the temperature of the base member 3 on the upstream side. Therefore, it is possible to promptly purify the purification target substance on the upstream side of the base member 3. If the base member 3 is more densified on the downstream side of the base member 3, then the temperature is promptly raised on the upstream side of the base member 3, but the purification rate is low, because the density of the base member 3 is low. Further, if the heat, which is received on the upstream side of the base member 3, is released to the outside from the outer circumferential portion 2, then the temperature is slowly raised on the downstream side, and a long time is required to raise the purification rate of the catalyst as a whole.

Note that when the base member 3 is densified on the upstream side as compared with the downstream side in the catalyst structure 1, the base member 3 may be densified in a stepwise manner. However, the base member 3 may be densified continuously. As described above, it is possible to further suppress the increase in the pressure loss by continuously densifying the base member 3.

As explained above, according to the catalyst structure 1 concerning this embodiment, it is possible to promptly raise the temperature of the catalyst from the state in which the temperature of the catalyst is low, for example, upon the cold start of the internal combustion engine. That is, it is possible to reduce the flow passage resistance, and it is possible to raise the purification rate.

Fourth Embodiment

Figure 12:
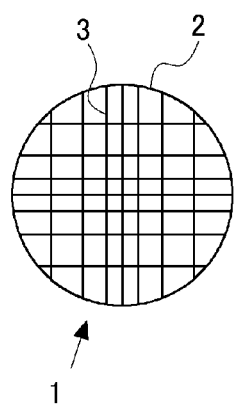
FIG. 12 shows a catalyst structure according to a fourth embodiment as viewed from the upstream side in the flow direction of the exhaust gas.

FIG. 12 schematically shows a catalyst structure according to this embodiment. FIG. 12 shows the catalyst structure 1 as viewed from the upstream side in the flow direction of the exhaust gas. The catalyst structure 1 according to this embodiment is formed so that the base member 3 is densified on the central side as compared with the outer circumferential portion 2 side of the base member 3 in the directions orthogonal to the flow direction of the exhaust gas. That is, the base member 3 is formed so that the density of the base member 3 per unit volume is increased on the central side as compared with the outer circumferential portion 2 side in the directions orthogonal to the flow direction of the exhaust gas. When the base member 3 is formed as described above, then the inertial resistance is more increased at the central portion of the base member 3, and hence the exhaust gas hardly flows. Note that also in this embodiment, it is allowable to determine the angle of the inclined portion 3A and the dimensions of the inclined portion 3A and the intersecting portion 3B so that the difference in the cross-sectional area is not more than a predetermined value, when the cross-sectional areas of the base member 3, which are provided in the cross sections orthogonal to the flow direction of the exhaust gas, are compared with each other at arbitrary two positions which are different from each other in the flow direction of the exhaust gas.

In this case, when it is assumed that the density of the base member 3 is constant, if the central axis of the catalyst structure 1 is positioned on an extension line of the central axis of the exhaust pipe connected to the catalyst structure 1, then the exhaust gas, which flows into the catalyst structure 1 from the exhaust pipe, easily flows through the vicinity of the central axis of the base member 3. In this case, the purification target substance is mainly purified by the catalyst disposed in the vicinity of the central axis of the base member 3, and hence it is hard to say that the function of the catalyst is sufficiently exhibited in the vicinity of the outer circumferential portion 2. On the other hand, in the case of the base member 3 according to this embodiment, the base member 3 is more densified and the inertial resistance is more increased at positions nearer to the central axis. Therefore, the exhaust gas hardly passes at such positions. On this account, a part of the exhaust gas, which flows into the catalyst structure 1, flows toward the outer circumferential portion 2 from the vicinity of the central axis at the end portion of the base member 3 on the upstream side. Accordingly, it is also possible to allow a larger amount of the exhaust gas to pass across the base member 3 in the vicinity of the outer circumferential portion 2. Note that the density in the radial direction of the base member 3 is determined, for example, by means of any experiment or simulation so that the flow of the exhaust gas in the base member 3 is uniform.

In the foregoing explanation, such a case has been described that the central axis of the base member 3 is positioned on the extension line of the central axis of the exhaust pipe. However, the central axis of the exhaust pipe may be deviated from the central axis of the base member 3 in some cases. In such a situation, the base member 3 may be formed so that the density of the base member 3 is the highest on the extension line of the central axis of the exhaust pipe, and the density is more lowered at positions separated farther therefrom toward the outer circumferential portion 2 side.

As explained above, according to the catalyst structure 1 concerning this embodiment, the exhaust gas flows uniformly across the base member 3, and hence it is possible to sufficiently exhibit the purification performance of the catalyst. That is, it is possible to reduce the flow passage resistance, and it is possible to raise the purification rate. Note that the base member 3 may be constructed so that the base member 3 is more densified on the downstream side as explained in the second embodiment, in addition to the construction concerning this embodiment. Further, the base member 3 may be constructed so that the base member 3 is more densified on the upstream side as explained in the third embodiment, in addition to the construction concerning this embodiment.

Fifth Embodiment

The base members 3 according to the first to fourth embodiments are formed by means of, for example, a 3D printer. However, in place thereof, the base member 3 can be also formed as a three-dimensional fabric. The three-dimensional fabric is woven up by using only warp wires. A fiber such as a metal fiber, a ceramics fiber or the like, which can endure the temperature of the exhaust gas, is used as a material of the warp wire. An explanation will be made below about a case in which a base member 3 is formed by using metal thin wires as warp wires.

Figure 13:
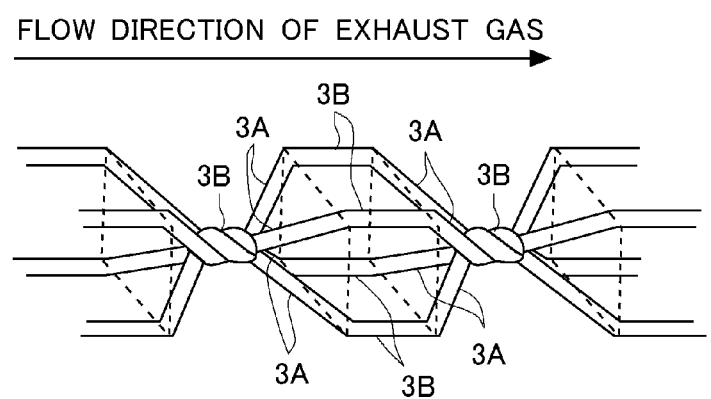
FIG. 13 shows an enlarged view illustrating a base member according to a fifth embodiment.

FIG. 13 shows an enlarged view illustrating the base member 3 according to this embodiment. An intersecting portion 3B according to this embodiment is formed by twisting metal thin wires. Note that in FIG. 13, a part of the intersecting portion 3B is shown in the drawing with straight lines while being simplified. The central axis of the intersecting portion 3B is formed so that the central axis is parallel to the flow direction of the exhaust gas. A plurality of (four in FIG. 13) metal thin wires are twisted in the flow direction of the exhaust gas about the center of the central axis. The metal thin wires, which form the intersecting portion 3B, extend obliquely toward the downstream side in the flow direction of the exhaust gas while being spread radially around the center of the central axis of the intersecting portion 3B. Thus, inclined portions 3A are formed. Then, the four inclined portions 3A, which have extended toward the downstream side in the flow direction of the exhaust gas from the four intersecting portions 3B which mutually adjoin in the directions orthogonal to the flow direction of the exhaust gas, are twisted to form the new intersecting portion 3B. In this way, the inclined portions 3A and the intersecting portions 3B are alternately arranged in the flow direction of the exhaust gas. Then, also in this embodiment, the angle of the inclined portion 3A and the dimensions of the inclined portion 3A and the intersecting portion 3B are determined so that the difference in the cross-sectional area is not more than a predetermined value, when the cross-sectional areas of the base member 3, which are obtained in the cross sections orthogonal to the flow direction of the exhaust gas, are compared with each other at arbitrary two positions which are different from each other in the flow direction of the exhaust gas. Note that the warp wires are twisted at the intersecting portion 3B. However, in place thereof, the warp wires may be joined to one another by means of, for example, the bonding (adhesion) or the welding. Further, it is also allowable to use a warp wire obtained by twisting a plurality of thinner fibers. As for the intersecting portion 3B, the central axis thereof is parallel to the flow direction of the exhaust gas. Therefore, the intersecting portion 3B is parallel to the flow direction of the exhaust gas as a whole. Further, the respective metal thin wires, which form the intersecting portion 3B, extend toward the downstream of the flow of the exhaust gas while being twisted. Therefore, the metal thin wires themselves are disposed obliquely with respect to the flow direction of the exhaust gas. In any case, it is affirmed that the intersecting portion 3B is not orthogonal to the flow direction of the exhaust gas.

It is also possible to reduce the flow passage resistance and raise the purification rate by means of the catalyst structure 1 formed as described above. Note that the angle of the inclined portion 3A may be changed with respect to the flow direction of the exhaust gas so that the base member 3 is more densified on the downstream side as explained in the second embodiment. Further, the angle of the inclined portion 3A may be changed with respect to the flow direction of the exhaust gas so that the base member 3 is more densified on the upstream side as explained in the third embodiment. Furthermore, the angle of the inclined portion 3A may be changed with respect to the flow direction of the exhaust gas in the direction orthogonal to the flow of the exhaust gas as explained in the fourth embodiment.

What is claimed is:

1. A catalyst structure provided in an exhaust passage of an internal combustion engine, the catalyst structure comprising:
   a base member which is formed by combining wire-shaped members, the base member being provided with:
      a plurality of inclined portions at which the wire-shaped members are arranged obliquely with respect to a flow direction of an exhaust gas; and
      intersecting portions at each of which the plurality of inclined portions intersect at both ends of each of the inclined portions, and from each of which the plurality of inclined portions extend radially at equal angles when the catalyst structure is viewed from an upstream side in the flow direction of the exhaust gas,
   wherein the wire-shaped members do not include any wire-shaped member which is arranged to be orthogonal to the flow direction of the exhaust gas.

2. The catalyst structure according to claim 1, wherein the base member is densified on a downstream side as compared with the upstream side in the flow direction of the exhaust gas.

3. The catalyst structure according to claim 1, wherein an angle of the inclined portion with respect to the flow direction of the exhaust gas is more increased on a downstream side in the flow direction of the exhaust gas.

4. The catalyst structure according to claim 1, wherein the base member is densified on the upstream side as compared with a downstream side in the flow direction of the exhaust gas.

5. The catalyst structure according to claim 1, wherein an angle of the inclined portion with respect to the flow direction of the exhaust gas is more increased on the upstream side in the flow direction of the exhaust gas.

6. The catalyst structure according to claim 1, wherein a density of the base member differs in a direction perpendicular to the flow direction of the exhaust gas.

7. A catalyst structure provided in an exhaust passage of an internal combustion engine, the catalyst structure comprising:
   a base member which is formed by combining wire-shaped members, the base member being provided with:
      a plurality of inclined portions at which the wire-shaped members are arranged obliquely with respect to a flow direction of an exhaust gas; and
      intersecting portions at each of which the plurality of inclined portions intersect at both ends of each of the inclined portions, and from each of which the plurality of inclined portions extend radially at equal angles with respect to the flow direction of the exhaust gas,
   wherein the wire-shaped members do not include any wire-shaped member which is arranged to be orthogonal to the flow direction of the exhaust gas.

* * * * *